US008906407B2

(12) United States Patent
Hasseberg et al.

(10) Patent No.: US 8,906,407 B2
(45) Date of Patent: Dec. 9, 2014

(54) PROTECTED ACTIVE COMPOUND FORMULATIONS OF AMINO ACIDS AND PROCESS FOR THEIR PREPARATION

(75) Inventors: Hans Albrecht Hasseberg, Gruendau-Lieblos (DE); Winfried Heimbeck, Moembris (DE); Dieter Greissinger, Niddatal (DE); Wolfgang Moese, Langenselbold (DE); Wolfgang Polzer, Gruendau (DE); Nongyuan Shi-Muenzenberg, Hanau (DE); Martin Koerfer, Kahl (BE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/289,052

(22) Filed: Nov. 4, 2011

(65) Prior Publication Data

US 2012/0045539 A1 Feb. 23, 2012

Related U.S. Application Data

(63) Continuation of application No. 10/434,623, filed on May 9, 2003, now abandoned.

(60) Provisional application No. 60/379,403, filed on May 13, 2002.

(30) Foreign Application Priority Data

May 10, 2002 (DE) .................. 102 20 785

(51) Int. Cl.
*A23K 1/17* (2006.01)
*A23K 1/00* (2006.01)
*A23K 1/16* (2006.01)
*A23K 1/18* (2006.01)

(52) U.S. Cl.
CPC .............. *A23K 1/1813* (2013.01); *A23K 1/004* (2013.01); *A23K 1/002* (2013.01); *A23K 1/005* (2013.01); *A23K 1/1634* (2013.01)

USPC .......................................... 424/442

(58) Field of Classification Search
None
See application file for complete search history.

(56) References Cited

U.S. PATENT DOCUMENTS

| | | | |
|---|---|---|---|
| 3,697,640 A | | 10/1972 | Grant et al. |
| 4,175,121 A | * | 11/1979 | Mantha ...................... 424/94.63 |
| 4,411,933 A | | 10/1983 | Samejima et al. |
| 4,568,559 A | | 2/1986 | Nuwayser et al. |
| 4,675,175 A | | 6/1987 | Autant et al. |
| 4,876,097 A | | 10/1989 | Autant et al. |
| 4,877,621 A | | 10/1989 | Ardaillon et al. |
| 4,983,403 A | * | 1/1991 | Ardaillon et al. .................. 426/2 |
| 5,098,718 A | | 3/1992 | Ardaillon et al. |
| 5,254,347 A | * | 10/1993 | Samejima et al. ............ 424/495 |
| 5,290,560 A | | 3/1994 | Autant et al. |
| 5,885,610 A | * | 3/1999 | Anderson ..................... 424/438 |
| 5,990,349 A | | 11/1999 | Geiger et al. |

FOREIGN PATENT DOCUMENTS

| | | |
|---|---|---|
| EP | 0 406 041 A1 | 1/1991 |
| EP | 0 427 639 A1 | 5/1991 |
| EP | 0 447 297 A1 | 9/1991 |
| EP | 0 495 349 | 7/1992 |
| EP | 0 588 346 | 3/1994 |
| EP | 0 614 615 | 9/1994 |

OTHER PUBLICATIONS

Mench et al., Ind. Eng. Chem. Prod. Res. Dev., 1968, 7(1), 2-7.

* cited by examiner

*Primary Examiner* — Snigdha Maewall
(74) *Attorney, Agent, or Firm* — Smith, Gambrell & Russell, LLP

(57) ABSTRACT

Active compound formulations for animal nutrition of amino acids, vitamins, enzymes and pigments, which are suitable for providing the active compounds in protected form for the nutrition of stock animals, in particular ruminants, and a process for the preparation of these protected active compound formulations.

6 Claims, No Drawings

PROTECTED ACTIVE COMPOUND FORMULATIONS OF AMINO ACIDS AND PROCESS FOR THEIR PREPARATION

CROSS REFERENCE TO RELATED APPLICATION

This application is a continuation of Ser. No. 10/434,623 filed May 9, 2003, which is being incorporated in its entirety herein by reference.

REFERENCE TO A RELATED APPLICATION

This application claims the benefit of provisional patent application 60/379,403 filed May 13, 2002 which is relied on and incorporated herein by reference.

INTRODUCTION AND BACKGROUND

The present invention relates to protected active compound formulations of amino acids, in particular methionine, and of vitamins, pigments or enzymes and a process for the preparation of these protected active compound formulations. This invention relates in particular to active compound formulations of amino acids which are suitable for providing amino acids in a rumen-protected form for the nutrition of stock animals, in particular ruminants. In a further aspect, the present invention relates to feedstuff containing the protected active compound formulations and method of using same.

Methionine or its substitute, the methionine hydroxy analogue, have been employed very successfully for decades in animal nutrition as additives for meeting the requirement of stock animals for the essential amino acid in a economical but also in a physiologically and ecologically optimum manner. However, methionine or also the hydroxy analogues cannot be employed directly in the nutrition of ruminants, since the microbes living in the rumen metabolize amino acids, hydroxy acids and proteins relatively rapidly. If unprotected amino acids or hydroxy acids are fed to ruminants, the predominant proportion of these amino acids or hydroxy acids would therefore not be available to the ruminant for its own supply, but would be lost for protein synthesis in metabolism by microbial breakdown in the rumen.

A large number of so-called rumen-protected products are known in the prior art, but a predominant number thereof are not stable enough to microbial breakdown in the rumen to ensure an appropriate use as an additive. The best products to date are based on the use of relatively large shaped pieces of methionine, such as, for example, granules or pellets, which are protected by coating with polymers. Ethylcellulose (EP 0 495 349) or a copolymer of vinylpyridine and styrene (U.S. Pat. No. 4,877,621 and U.S. Pat. No. 4,876,097) is used, for example, as the coating composition.

The products described in EP 0 495 349 comprise a shaped piece of methionine which is obtained by pelleting methionine and auxiliary substances and is then coated with a protective shell of ethylcellulose, preferably in 2-layer application with an inorganic auxiliary substance or filler (e.g. sodium aluminum silicate). The cylindrical shape of the pellets resulting from the preparation leads to edges with a relatively thin coating, which are regarded as intentional breaking points and as essential for the release of the active compound.

EP 0 495 349 (comparison example 5) furthermore reports that rounded-off particles with a uniformly thick film thickness show adverse effects.

The products obtained in EP 0495 349 release methionine in the entire digestive tract, relatively little in the rumen, which can be seen from the high in vitro rumen protection of ≥80%, but increasingly more in the further digestive tract of the abomasum and small intestine. These delayed release properties, also called "slow release" properties, are preferred here since a small introduction of methionine in the rumen stabilizes the rumen flora. This is favorable overall, and a slow uniform release of methionine in the further course of digestion leads to a more uniform utilization than a sudden pH-controlled release in the abomasum at pH 2, which is aimed for with the products from U.S. Pat. No. 4,877,621 and U.S. Pat. No. 4,876,097.

On the basis of the size of the particles shown in EP 0 495 349 of approx. 3.5 mm length, however, stable homogeneous distribution of such products in feed mixtures is not always easy to achieve, on the one hand because of the small number of particles, due to the size, per volume and on the other hand because of the difference in size with respect to the other mixed feed components, which can lead to demixing in some cases under adverse conditions. On the other hand, there is no mechanical stability when exposed to very high stresses, such as e.g. during pelleting of the feed.

The protected products described in U.S. Pat. No. 4,877,621 and U.S. Pat. No. 4,876,097 are based on coating of pellets which comprise amino acids and have diameters of 0.1 to approx. 5 mm, a pH-sensitive protective shell being built up. Since the intention is to produce pH-dependent release properties, a copolymer of 2-vinylpyridine and styrene is always used here as an essential constituent, and in U.S. Pat. No. 4,876,097 additionally further components, such as e.g. zein cellulose acetobutyrate, polyvinyl acetate, chitosan, ethylcellulose and further auxiliary substances, including various solvents, which leads to a complicated protective shell comprising several components. The release properties indeed show entirely good results, but are achieved at the expense of a high complexity and by the use of coating or auxiliary substances which in some cases have not yet been approved in feedstuffs legislation, which makes economical utilization difficult.

EP 0 614 615 relates to a feedstuffs additive of a rumen-protected composition which comprises a biologically active substance and a protective shell and furthermore also has a pelleting-resistant protective shell of natural or synthetic polymers. Polymers which are suitable for this pelleting-resistant protective shell have an elasticity modulus at 30° C. of between $10^8$ and $10^{11}$ dynes/cm$^2$ and a glass transition temperature of between 50° C. and 150° C. This composition comprises pelleted granules with a particle size of greater than 1.5 mm.

U.S. Pat. No. 5,290,560 describes a process for the preparation of granules by extrusion with food or medicament active compounds for ruminants, in which the core of the granules is extruded in a first step and the core is coated by pulverization in a second step.

EP 588 346 describes a process for the preparation of 1.5 mm granules by extrusion with food or medicament active compounds for ruminants, in which the core of the granules is extruded in a first step and the core is coated by fluidized bed coating in a second step. The feedstuffs additive composition for ruminants described here comprises a coated core of the biologically active substance. The biologically active substance is an amino acid, such as e.g. lysine or methionine. The coating material comprises hydrogenated animal fat, oil or wax and an aliphatic monocarboxylic acid and/or nucleic acid, nucleotides, nucleosides, bases containing nucleic acid or salts.

In view of the problems described, it was an object to provide an active compound formulation which does not have the above-mentioned disadvantages of the existing products or has them to a significantly smaller extent and shows the advantages of the "slow release" properties described in EP 495349, that is to say an increased release after >6 h (≅residence time in the rumen).

One possibility of achieving the object described chiefly comprises coating of significantly smaller particles. However, this possibility on the one hand has the disadvantage of increased consumption of often relatively expensive coating compositions. On the other hand, multi-layer application with additional components (fillers), which allow later dissolution of the protective shell at the desired place, such as is necessary in the case of the products described in EP 0 495 349, can scarcely be realized with very small particles (see EP 0 614 615, comparison examples 1-6).

SUMMARY OF THE INVENTION

An object of this invention is therefore to provide a protected active compound formulation which is based on amino acids, in particular methionine or salts thereof, and has a particle diameter of less than 1000 µm. Furthermore, a rumen-protected active compound formulation should be coated with a protective shell and by one-layer application, so that analogous rumen protection rates compared with the products e.g. from EP 0 495 349 and distribution properties in the mixed feed which are moreover improved are obtained.

This rumen-protected active compound formulation based on amino acids should meet the requirement of being able to be absorbed to an increased extent under the conditions of the subsequent abomasum or at the latest in the small intestine of the ruminant.

Active compounds which are employed are, for example, amino acids or salts thereof, vitamins, pigments or enzymes.

In addition, the formulation should have the highest possible mechanical resistance, so that no relatively large losses of intactly protected particles occur during the typical processes of preparation of mixed feeds, such as mixing, conveying or pelleting.

This requirement profile should furthermore as far as possible be achieved only with the aid of auxiliary substances which are approved in feedstuffs legislation and in the end move the active compound formulation into a price frame which does not exceed that of the current products on the market. These requirements are summarized in the following:
In vitro release after 6 hours:
  corresponds to the protection rate in the rumen, i.e. a maximum of 25% release/digestion of the biologically active substance in the rumen at a pH of 5.5-6.5, in approx. 6 hours (h) and in the presence of microbes, protozoa;
In vitro release after 6-24 hours:
  corresponds to release in the further digestive tract after a residence time of more than 6 h to 24 h and should be 35-65% of the biologically active substance initially contained in the product,
The active compounds and coating materials should withstand the conditions of feed processing of mixing, conveying and pelleting (approx. 80° C.-100° C., steam, pressure, shear forces).

The product according to the invention meets these conditions.

It has furthermore been found that the "slow-release" active compound formulations according to the invention are also resistant to the oxidation action of air, the effects of water or of trace elements, e.g. during storage in bulk or in a feed mixture. The active compound formulations according to the invention can moreover be employed in other uses in which a controlled "slow-release" type of release is desirable, such as e.g. in the case of vitamins, pigments or enzymes.

A further object of this invention is to provide a process for the preparation of these protected active compound formulations.

This object is achieved in respect of the active compound formulation in that the desired active compound, in particular methionine, is employed directly in the form of particles or crystals with a diameter of less than 1 mm (1000 µm) without a prior granulation step, or spray granules with a diameter of less than 1 mm. The particle diameter is that before the coating. The shape of the particles to be processed is not particularly critical, it is therefore possible to employ both commercially available platelet-shaped crystals and circular crystals.

It has been found that, for example, methionine particle coated according to the invention with a diameter of less than 1 mm have analogous rumen protection rates compared with the products described in EP 0 495 349 (comparison example 5).

DETAILED DESCRIPTION OF THE INVENTION

The active compound formulations according to the invention in general comprise small coated active compound particles in the particle size range of 100 to 1000 µm, in particular 200 to less than 800 µm, preferably 300 to 700 µm, particularly preferably 400 to 600 µm.

The active compound formulation according to the invention are coated with at least one protective shell. The protective shell can comprise a single coating material or a composition of coating materials. Protective shells of a single coating material are preferred in this invention. Active compound formulations with a single protective shell produced by one-layer application are particularly preferred.

Coatings based on film-forming agents comprising naturally occurring or modified naturally occurring polymers or homo- and copolymers which can be prepared by conventional known processes are suitable for the protective shell. Synthetic polymers are also suitable. Such suitable polymers are, for example, cellulose esters, ethers, acrylates, poly (meth)acrylates, polyamides, polyesters or copolymers of e.g. acrylonitrile, styrene, ethylene, propylene, butadiene, or esters and amides of methacrylic acid or acrylic acid.

A coating based on cellulose ethers, preferably ethylcellulose, is very particularly suitable. It is particularly preferable to use ethylcellulose dissolved in ethanol, since a coating with a content of 4 to 30 percent by weight (wt. %), preferably 5-20 wt. % and particularly preferably 9-15 wt. % ethylcellulose, based on the end product, can be achieved in this manner.

Various ethylcellulose types can be employed as the coating composition according to the invention. Thus, it has been possible to employ ethylcellulose types of varying viscosity according to the different degree of substitution all from Hercules (N10, N50, T50, X200) by way of example, and to achieve similarly advantageous results here.

The ethylcellulose types investigated here by way of example correspond to various viscosity classes. The number corresponds to the dynamic viscosity in mPa*s measured in a 5% solution in toluene/ethanol 80:20 (w/w) at 25° C.

The active compound formulations according to the invention can be produced in an advantageous manner by fluidized bed coating, but optionally also by other processes of microencapsulation, such as for example, coacervation.

It has been possible here, in an unforeseeable manner, to dispense with the use of further inorganic or organic auxiliary substances, such as e.g. sodium aluminum silicate or the Na salt of carboxymethylcellulose or other substances described in the above-mentioned patents, which leads to a significant simplification of the process and of the active compound formulations and to the direct utilizability of such active compound formulations without prior, tedious feedstuffs legislation approval processes.

It has been found that methionine crystals in particular can be employed directly without a prior granulation step. It is possible here to employ both platelet-shaped crystals and round crystals of conventional commercial quality.

The preferred particle size of the active compound formulation of 400-600 μm for the subsequent coating can be achieved by simple operations such as sieving, air sifting or another separation process from the prior art, it as a rule being sufficient to carry out a single separation operation, such as for example, a sieving over a 400 μm sieve, because the commercially available methionine products scarcely have contents above 600 μm.

To produce round crystals, if this is desired, methionine particles with the conventional platelet shape can optionally also be rounded off or granulated, with or without the presence of further auxiliary substances. The consumption of coating composition is lowest in the case of round particles.

It is also possible to employ spray granules prepared from methionine solutions or methionine salt solutions, such as e.g. Na, K, Ca, Mg, Zn methionate in pure or mixed form, which have a rounded-off shape due to the preparation.

To prepare the active compound formulations according to the invention by fluidized bed coating, DL-methionine, for example, in the particle size range of significantly smaller than 1000 μm is initially introduced into a fluidized bed apparatus and sprayed with a coating composition—preferably ethylcellulose—dissolved in an organic solvent. The conditions are adjusted such that a covering of the particles which is as complete as possible is achieved with minimal agglomeration.

The preparation of the active compound formulations according to the invention and the test methods used for their characterization are described in the following.

Examples 1-9 and Comparison Examples A and B

Determination of the Release Properties
Rumen protection rate [%]=Content of the still protected methionine after an incubation time of 6 to 24 h in a test medium (water pH 5.5 or buffer solution).
Release Test (In Vitro) for Active Compound Formulations with pH-Independent Release Properties The active compound formulation is shaken in desalinated water at 37° C./pH 5.5 in a vibrating water-bath—desired value typical for product A (protected methionine, pellet-shaped approx. 1.8*3.5 mm, analogously to ex. 11 from EP 0 495 349)

| | |
|---|---|
| for 6 h (≈rumen) | high ≥ 80% |
| for 24 h (≈rumen and further digestive tract) | low approx. ≤ 45% |

After the particular period of time in the vibrating water-bath, the solutions were filtered, the methionine released from the protected active compound formulations was determined quantitatively in the filtrate (by bromide/bromate titration) and the protection rate was calculated according to the following formula:

Protection rate[%]=1−% methionine released/% methionine starting amount)*100

The use, preferred here, of desalinated water instead of the buffer mixtures described in EP 0 495 349 leads to equivalent results in investigations on pH-independent "slow release" systems (comparison example B).

The in vitro protection rates after incubation for 6 h measured in this manner have a tendency to correlate well according to EP 0 495 349 with results of in vivo experiments. On the other hand, the in vitro protection rates after incubation for 24 h are not identical to the protection rates or corresponding release rates to be determined in living systems. As EP 0 495 349 shows, in vitro protection rates of 30-40% after 24 h (corresponds to release of approx. 45-55%) correspond to good in vivo bioavailabilities (=methionine content in blood plasma), so that the 24 h laboratory value is to be seen here as a guideline parameter.

Determination of the Stabilities Towards Pelleting

Preparation of the Mixtures

Milk yield feed ML 183 (Raiffeisen, Wiesbaden) was mixed together with the corresponding amounts of protected methionine active compound formulation according to the invention in a 50 L Lödige mixer for 4 min at 100 rpm. The finished mixtures were employed for pelleting.

The preparation of feed pellets was carried out in a Walther EI 15 press under the pelleting conditions stated in table I. This was first started up with feed containing no active compound. After a constant press run had been reached, the mixtures were pressed successively with various test products.

The pellets were cooled slowly, the fine content (particle size<3 mm) was sieved off and the finished batches were unloaded.

TABLE I

| PELLETING CONDITIONS | |
|---|---|
| Press | Walther EI 15 |
| Die bore | 5.5 mm |
| Channel length | 30 mm |
| Current uptake | 6.3-6.8 A |
| Pelleting temperature | 65-75° C. |
| Steam pressure | 8 bar |
| Concentration of test substance | 3% DL-methionine weight equivalent in milk yield feed |
| Pellet size | 5.5 * 10-12 mm |
| Residual moisture content after cooling | approx. 11% |

The protection rates were measured on the feed pellets prepared in this way in a vibrating water-bath as described above. The methionine released was quantified here by HPLC chromatography.

Preparation of the Protected Methionine Particles

The experiments were carried out in a laboratory fluidized bed granulating unit. In each case 1 kg of sieved methionine (particle range as stated in table II) per experiment was initially introduced into the fluidized bed apparatus as the starting material. Either platelet-shaped crystals (Degussa AG) or crystals with a round particle shape (Sumitomo) were used. Various ethylcellulose types from Hercules Aqualon (viscosity class N10, N50, T50, X200 as stated in table II) were employed for the coating.

Ethylcellulose was sprayed as a 5% ethanolic solution through a nozzle from the top on to the methionine particles held underneath in the fluidized bed.

Comparison examples A and B were coated in accordance with EP 0 495 349 with 2 layers of different coating materials.

Nitrogen was employed as the drying and atomizing gas and the unit was kept in the non-explosive range in this manner. The following test settings were used:

Intake temperature: 110° C.
Bed temperature: 85-90° C.
Waste air temperature: 77-80° C.
Inflow volume flow: 90 mN³/h
Atomization pressure: 3 bar The consumption of coating composition was monitored continuously and intermediate samples were taken from the fluidized bed apparatus at regular intervals of time. Both on the intermediate samples and on the end sample, the methionine content was determined and a release test was carried out to determine the protection rates.

In this manner it was possible to determine the protection rates as a function of the methionine content and of the complementary content of coating material for each combination of methionine and coating material. All the results in this respect are listed in table II.

By pelleting the active compound formulations according to the invention in milk yield feed and subsequent repetition of the release test, the protection rate after pelleting was additionally determined as a measure of the stability towards pelleting (table II).

As can easily be seen from table II, when sieved platelet-shaped methionine with a particle size of 400-600 μm is employed at an ethylcellulose application of approx. 17%, protection rates of 81% after 6 h and 46% after 24 h are found in the standard test (see ex. 5). With round DL-methionine crystals, rumen protection rates of 79% after 6 h and 52% after 24 h were already found with an ethylcellulose application of 8.7% (see ex. 4).

In both cases, the protection rates were in the range of the values mentioned in EP 0 495 349. In the case of the rounded-off crystals, approximately the same protection rates as in the case of the platelet-shaped crystals were achieved with about half the application amount.

After pelleting in milk yield feed, it was still possible to obtain in vitro rumen protection rates of up to 34% after 6 h (ex. 5, 6), which means a significant improvement compared with the products from EP 0 495 349, which are less stable to pelleting because of their size (protection rate after pelleting (6 h): 15%, comparison example B). Protected active compound formulations with a particle size of 100-300 μm of the methionine particles employed led to protection rates after pelleting which were again lower, which suggests that the optimum range has already been left again here. (Example 7 and 8, protection rate after pelleting (6 h): 8%)

TABLE II

Methionine active compound formulations protected by coating

| Example/ comparison example no. | Methionine quality | Coating material Content, %, type | Methionine content % | Protection rates (in vitro) | | | |
|---|---|---|---|---|---|---|---|
| | | | | Rumen after 6 h, % | Total after 24 h, % | Release 6 h: 24 h, % | After pelleting 6 h, % |
| 1 | platelets 400-600 μm | 8.3, EC N10 | 91.7 | 22 | 5 | 17 | nm[1] |
| | | 16.6, EC N10 | 83.4 | 73 | 40 | 33 | |
| 2 | platelets 400-600 μm | 4.7, EC N50 | 95.3 | 6 | 3 | 3 | nm[1] |
| | | 12.0, EC N50 | 88.0 | 63 | 22 | 41 | |
| 3 | platelets 400-600 μm | 19.9, EC N50 | 80.1 | 80 | 53 | 27 | 30 |
| 4 | round crystals 400-600 μm | 4.3, EC N50 | 95.7 | 49 | 18 | 31 | |
| | | 6.8, EC N50 | 93.2 | 69 | 39 | 30 | |
| | | 8.7, EC N50 | 91.3 | 79 | 52 | 27 | |
| | | 11.2, EC N50 | 88.8 | 83 | 60 | 23 | |
| | | 13.2, EC N50 | 86.8 | 89 | 71 | 18 | 26 |
| A | platelets 400-600 μm | 5.6, EC N50 2.2, Wessalith P | 90.7 | 26 | 6 | 20 | nm[1] |
| 5 | platelets 400-600 μm | 7.5, EC T50 | 92.5 | 35 | nm[1] | nm[1] | |
| | | 10.4, EC T50 | 89.6 | 54 | 15 | 39 | |
| | | 14.2, EC T50 | 85.8 | 71 | 32 | 39 | |
| | | 17.6, EC T50 | 82.4 | 81 | 46 | 35 | |
| | | 20.9, EC T50 | 79.1 | 86 | 56 | 30 | 34 |
| 6 | platelets 400-600 μm | 6.6, EC X200 | 93.4 | 26 | nm[1] | nm[1] | |
| | | 8.9, EC X200 | 91.1 | 42 | 10 | 32 | |
| | | 14.4, EC X200 | 85.6 | 66 | 32 | 34 | |
| | | 17.8, EC X200 | 82.2 | 75 | 49 | 26 | |
| | | 18.5, EC X200 | 81.5 | 77 | 46 | 31 | 34 |
| 7 | round crystals 100-300 μm | 6.0, EC N50 | 94.0 | 13 | nm[1] | nm[1] | |
| | | 12.9, EC N50 | 87.1 | 57 | 17 | 40 | |
| | | 15.6, EC N50 | 84.4 | 66 | 27 | 39 | |
| | | 15.8, EC N50 | 84.2 | 63 | 30 | 33 | 8 |
| 8 | round crystals 100-300 μm | 4.9, EC T50 | 95.1 | 14 | nm[1] | nm[1] | |
| | | 10.2, EC T50 | 89.8 | 55 | 21 | 34 | |
| | | 15.1, EC T50 | 84.9 | 74 | 42 | 32 | 8 |
| 9 | platelets 100-300 μm | 7.9, EC N50 | 92.1 | 27 | nm[1] | nm[1] | |
| | | 14.5, EC N50 | 86.5 | 23 | nm[1] | nm[1] | |
| | | 16.9, EC N50 | 84.1 | 37 | nm[1] | nm[1] | |
| | | 19.2, EC N50 | 80.8 | 41 | 7 | 34 | |
| | | 21.6, EC N50 | 78.4 | 37 | 9 | 28 | nm[1] |
| B | Pellets analogously to ex. 11 from EP 0495349 1800-3500 μM | 4.6, EC N50 2.3, Na Al silicate | 84.8 | 82 | 42 | 40 | 15 |

[1]nm = not measured

Protection rates after 6 h of at least 60%, preferably of more than 70%, in particular of more than 80%, and by comparison with this correspondingly lower protection rates after 24 h, which are at least 30%, preferably at least 35%, but in particular more than 40% below those after 6 h, have proved, according to the disclosure of EP 0 495 349, to be a prerequisite for the bioavailability (increase in the methionine blood plasma level) to ruminants which is described there.

In general, the products of the invention have a protection rate in the in vitro release test after 6 hours of 60-90%, and after 6-24 hours of 35-50% after 24 hours, preferably protection rates in the in vitro release test after 6 hours of 75-85%, and after 6-24 hours of 35-50% after 24 hours.

In principle, a higher protection rate is achieved with a higher layer application. However, too high a protection has the effect in turn that too little of the protected amino acid is available to the animal. On the basis of the disclosure in EP 0 495 349, it was to be assumed that round particles do not bring about favorable release properties because of their uniform layer thickness. However, against expectation it has been found that small round and also platelet-shaped particles with a particle size of between 100 μm and 1000 μm which are coated with a single covering with a single protective shell, in particular of ethylcellulose have favorable release properties equivalent to the products from EP 0 495 349, as shown, in particular, by the comparison of examples 3, 4, 5, 6 with comparison example B.

In addition to the release properties and the mechanical stability, it is also important that feed mixtures show as little tendency towards demixing as possible during handling, that is to say the lowest possible demixing on trickling. To obtain information on the demixing properties of the active compound formulations according to the invention during trickling compared with conventional products, these were mixed into the usual feed for ruminants and a trickling demixing test was carried out. In this, the initially homogeneously mixed feed mixtures were allowed to trickle through a discharge funnel and a poured cone was produced in this manner under standardized conditions, samples being taken in this at various defined points for analysis of the methionine content. This trickling demixing test is described in examples 10-25 and comparison examples C and D.

Examples 10 to 17

Comparison Examples C-F

Determination of the Tendencies Towards Demixing

Mixtures of the active compound formulations according to the invention with the usual feedstuffs were prepared. For this, both commercially available mineral feed, such as Blattin (Höveler) and Spur-a-min (Höveler) and organic feed such as soya meal (Raiffeisen) and milk yield feed (Raiffeisen) were mixed with protected methionine active compound formulations according to the invention as stated in table III and a uniform mixture was produced in a tumble mixer. The particle size distributions of the feed types employed is stated in table IV.

The mixtures produced in this manner were investigated for their tendencies towards demixing during trickling in the following test. For this, the mixtures were in each case transferred to a glass funnel and allowed to run out from a falling height of 10 cm on to a flat base. The dimensions of the funnel were: diameter 100 mm, cone height 90 mm, diameter of the discharge 7 mm, discharge length 90 mm, falling height from the discharge 100 mm.

The cone formed in each case was divided into 3 layers of equal height, the layer produced in each case was ground (<250 μm) and the methionine content was determined in each layer by HPLC chromatography. From the 3 methionine contents of the 3 layers, the variation coefficients was determined as a measure of the demixing during trickling. The higher the particular variation coefficients found, the greater the particular demixing during trickling. The smaller the variation coefficients, the lower the demixing of the particular product from the particular feed mixture during trickling. The results are summarized in table V.

The variation coefficient (VC) of the trickling demixing experiments were calculated according to the following formula:

$$VC[\%] = (\text{standard deviation of the individual measurements/mean of the individual measurements}) * 100$$

TABLE III

ACTIVE COMPOUND FORMULATIONS WITH THE USUAL FEEDSTUFFS

| | Example/comparison example no. | | | | | |
|---|---|---|---|---|---|---|
| Batch with | 10 | 11 | C | 12 | 13 | D |
| Blattin, g | 200 | 200 | 200 | | | |
| Spur-a-min, g | | | | 200 | 200 | 200 |
| End product from ex. 5 (79.1% methionine), g | 25.28 | | | 25.28 | | |
| End product from ex. 4 (86.8% methionine), g | | 23.04 | | | 23.04 | |
| Product A[1] (86.6% methionine) | | | 22.91 | | | 22.91 |
| Methionine content (calculated), % | 8.9 | 8.9 | 8.9 | 8.9 | 8.9 | 8.9 |

| | Example/comparison example no. | | | | | |
|---|---|---|---|---|---|---|
| Batch with | 14 | 15 | E | 16 | 17 | F |
| Soya extracted meal, g | 200 | 200 | 200 | | | |
| Milk yield feed, g | | | | 200 | 200 | 200 |
| End product from ex. 5 (79.1% methionine), g | 3.03 | | | 3.03 | | |
| End product from ex. 4 (86.8% methionine), g | | 2.76 | | | 2.76 | |
| Product A[1] (86.6% methionine) | | | 2.77 | | | 2.77 |
| Methionine content (calculated), % | 1.2 | 1.2 | 1.2 | 1.2 | 1.2 | 1.2 |

[1]Product A = protected methionine, pellet-shaped approx. 1.8 * 3.5 mm, analogously to ex. 11 from EP 0 495 349.

TABLE IV

PARTICLE SIZE DISTRIBUTION AND BULK DENSITY OF THE FEEDSTUFFS EMPLOYED

| Particle size distribution | Blattin M24 ADE | Spur-a-min | Extracted soya KFW | Milk yield feed ML 183 |
|---|---|---|---|---|
| <100 μm [%] | 4.4 | 20.8 | 3.2 | 8.4 |
| 100-150 μm [%] | 3.6 | 7.1 | 1.2 | 4.6 |
| 150-200 μm [%] | 5.0 | 8.0 | 1.3 | 5.5 |
| 200-300 μm [%] | 10.6 | 18.0 | 3.7 | 11.3 |
| 300-500 μm [%] | 15.5 | 156 | 8.9 | 17.2 |
| 500-710 μm [%] | 14.8 | 9.0 | 9.8 | 11.9 |
| 710-1000 μm [%] | 21.5 | 11.2 | 15.4 | 12.2 |
| 1000-1400 μm [%] | 18.5 | 8.2 | 22.6 | 14.6 |
| 1400-2000 μm [%] | 5.6 | 1.7 | 18.7 | 7.3 |
| 2000-3150 μm [%] | 0.6 | 0.4 | 12.2 | 7.0 |
| >3150 μm [%] | | | 30 | |
| Bulk density [g/L] | 1009 | 833 | 618 | 552 |

TABLE V

DEMIXING OF PROTECTED METHIONINE ACTIVE COMPOUND FORMULATIONS DURING TRICKLING

| Example/ comparison example no. | Feedstuff | Protected methionine from example no. | Methionine content in the poured cone, [%] | | VC, [%] |
|---|---|---|---|---|---|
| 10 | Blattin M24 ADE | Ex. 5 (platelets) | top: | 8.9 | 7 |
| | | | middle: | 10.0 | |
| | | | bottom: | 10.0 | |
| 11 | | Ex. 4 (round particles) | top: | 7.7 | 9 |
| | | | middle: | 8.8 | |
| | | | bottom: | 9.1 | |
| C | Blattin M24 ADE | product A[1] | top: | 12.8 | 60 |
| | | | middle: | 2.9 | |
| | | | bottom: | 9.9 | |
| 12 | Spur-a-min | Ex. 5 (platelets) | top: | 8.1 | 28 |
| | | | middle: | 8.4 | |
| | | | bottom: | 13.1 | |
| 13 | | Ex. 4 (round particles) | top: | 6.8 | 38 |
| | | | middle: | 6.5 | |
| | | | bottom: | 12.3 | |
| D | Spur-a-min | product A[1] | top: | 6.2 | 70 |
| | | | middle: | 3.5 | |
| | | | bottom: | 14.3 | |

| Example no. | Feedstuff | Protected methionine from example no. | Methionine content in the poured cone, [%] | | VC, [%] |
|---|---|---|---|---|---|
| 14 | Soya extracted meal KFW | Ex. 5 (platelets) | top: | 1.3 | 46 |
| | | | middle: | 1.5 | |
| | | | bottom: | 0.5 | |
| 15 | | Ex. 4 (round particles) | top: | 0.9 | 38 |
| | | | middle: | 1.3 | |
| | | | bottom: | 0.6 | |
| E | | product A[1] | top: | 1.1 | 31 |
| | | | middle: | 0.9 | |
| | | | bottom: | 1.7 | |
| 16 | Milk yield feed ML 183 | Ex. 5 (platelets) | top: | 1.2 | 18 |
| | | | middle: | 1.3 | |
| | | | bottom: | 0.9 | |
| 17 | | Ex. 4 (round particles) | top: | 0.8 | 7 |
| | | | middle: | 0.8 | |
| | | | bottom: | 0.9 | |
| F | | product A[1] | top: | 0.9 | 27 |
| | | | middle: | 1.1 | |
| | | | bottom: | 1.5 | |

[1]Product A = protected methionine, pellet-shaped approx. 1.8 * 3.5 mm, analogously to example 11 from EP 0 495 349

The greater the differences in the contents analyzed within the poured cone, the greater the demixing has been during trickling. The variation coefficient of the content determination therefore serves as a measure of the demixing during trickling.

The comparison of examples 10 and 11 with comparison example C or examples 12 and 13 with comparison example D shows, in mixtures of the mineral feeds Blattin and Spur-a-min with the protected active compound formulations according to the invention, significantly lower variation coefficients of 7-9% and 28-38% respectively compared with conventional products with 60 and 70% respectively.

In the case of soya extraction meal as the carrier material, comparable VC values were still found with 38-46% in comparison with 31% (examples 14 and 15 compared with comparison example E).

In milk yield feed, the VC values of the active compound formulations according to the invention of 7-18% were in turn more favorable than in the case of conventional products with 27% (examples 16 and 17 compared with comparison example F).

The significantly lower demixing of the active compound formulations according to the invention during trickling increases the certainty that the animals fed are supplied more uniformly with the feed starting substances in question, and therefore contributes towards better feeding results, which is of decided advantage from economic and ecological aspects.

Further modifications and variations of the invention will be apparent to those skilled in the art from the foregoing and are intended to be encompassed by the claims appended hereto.

German priority application 102 20 785.2 filed May 10, 2002 is relied on and incorporated herein by reference.

We claim:

1. A feedstuff for ruminants, characterized as having a small variation coefficient comprising ruminant milk yield feed and a nutritive amount of coated particles of methionine or salt thereof in platelet-shaped or round crystal form, wherein the coating consists of a one-layer application of a rumen-protected shell, and the particles have a diameter between 400 and 600 μm, where in the protective shell is 4 to 30 wt. % based on total weight of said coated particles, wherein the layer consists of ethyl cellulose, wherein the layer imparts to the coated particle delayed-release properties and protection rates in an in-vitro rumen release test after 6 h of 60-90% and of 10-60% after 24 h, wherein the coated particles exhibit mechanical stability during feed pelleting and wherein after pelleting in milk yield feed, protection rates of the coated particle in an in-vitro rumen release test after 6 h of at least 26% are obtained.

2. The feedstuff of claim 1, wherein the ruminant feed is milk yield feed and is produced by pelleting.

3. The feedstuff of claim 1, wherein the methionine salts are Na, K, Ca, Mg or Zn salts.

4. The feedstuff of claim 1, wherein the particles are characterized by protection rates in the in-vitro rumen release test after 6 h of 75-85%, and of 35-50% after 24 h.

5. The feedstuff of claim 1, wherein after pelleting in milk yield feed protection rates of the coated particle in an in-vitro rumen release test after 6 h of up to 34% are obtained.

6. A process for providing nutrition for ruminants comprising feeding the ruminant the feed stuff of claim 1.

* * * * *